United States Patent
Walker et al.

(10) Patent No.: US 11,066,247 B2
(45) Date of Patent: Jul. 20, 2021

(54) POWERSWEEP INCLUDING GEARBOX SHIFTER MECHANISM

(71) Applicant: CTB, Inc., Milford, IN (US)

(72) Inventors: Jeffrey E. Walker, Fort Wayne, IN (US); Adam K. Gutwein, Goshen, IN (US); Mark S. Dingeldein, Milford, IN (US)

(73) Assignee: CTB, Inc., Milford, IN (US)

( * ) Notice: Subject to any disclaimer, the term of this patent is extended or adjusted under 35 U.S.C. 154(b) by 0 days.

(21) Appl. No.: 16/810,711

(22) Filed: Mar. 5, 2020

(65) Prior Publication Data
US 2020/0290813 A1   Sep. 17, 2020

Related U.S. Application Data

(60) Provisional application No. 62/818,307, filed on Mar. 14, 2019.

(51) Int. Cl.
*B65G 33/34* (2006.01)
*G05G 1/04* (2006.01)
(Continued)

(52) U.S. Cl.
CPC .............. *B65G 33/34* (2013.01); *B65G 33/14* (2013.01); *G05G 1/025* (2013.01); *G05G 1/04* (2013.01);
(Continued)

(58) Field of Classification Search
CPC ........ B65G 33/34; B65G 33/14; B65G 33/18; B65G 33/32; B65G 65/40; B65G 65/42;
(Continued)

(56) References Cited

U.S. PATENT DOCUMENTS 1,809,965 A * 6/1931 Felton .................... G05G 5/06
74/491
3,064,830 A * 11/1962 Reed .................. A01F 25/2018
414/310
(Continued)

OTHER PUBLICATIONS

International Search Report and Written Opinion in corresponding International Patent Application No. PCT/US2020/021855 dated May 26, 2020.

*Primary Examiner* — William R Harp
(74) *Attorney, Agent, or Firm* — Harness, Dickey & Pierce, P.L.C.

(57) ABSTRACT

A gearbox below a grain bin floor can have a shift coupling movable between a drive position and a neutral position. A control rod can be axially movable between a corresponding drive position and a corresponding neutral position. A pair of biasing members can be operably positioned between the control rod and the shift coupling to bias the shift coupling in opposite directions. The opposite biasing forces of the biasing members can act against each other to bias the control rod into the neutral positioning recess to retain the external shift coupling and the control rod in the neutral position and the corresponding neutral position, respectively. The opposite biasing force of the biasing members can bias the control rod into the drive positioning recess to retain the external shift coupling and the control rod in the drive position and the corresponding drive position, respectively.

19 Claims, 7 Drawing Sheets

(51) Int. Cl.
 *G05G 1/02* (2006.01)
 *B65G 33/14* (2006.01)
 *G05G 5/06* (2006.01)

(52) U.S. Cl.
 CPC ......... *G05G 5/06* (2013.01); *B65G 2201/042* (2013.01)

(58) Field of Classification Search
 CPC .... B65G 65/425; B65G 65/46; B65G 65/466; A01F 25/2018; G05G 1/04; G05G 1/025; G05G 1/05; G05G 1/06
 See application file for complete search history.

(56) References Cited

U.S. PATENT DOCUMENTS

| | | | |
|---|---|---|---|
| 3,084,814 A | | 4/1963 | Schaefer |
| 3,151,749 A | | 10/1964 | Long |
| 3,252,598 A | | 5/1966 | Noble |
| 3,313,428 A | | 4/1967 | Schaefer |
| 4,029,219 A | * | 6/1977 | Rutten ................. B65G 65/466 414/308 |
| 4,875,820 A | * | 10/1989 | Lepp ...................... B65G 33/32 414/306 |
| 5,896,782 A | * | 4/1999 | McIlwain ........... A01F 15/0841 56/10.2 A |
| 6,254,329 B1 | | 7/2001 | Sukup et al. |
| 7,544,031 B2 | * | 6/2009 | Kaeb ................... B65G 65/466 414/306 |
| 8,210,342 B2 | | 7/2012 | Lepp et al. |

* cited by examiner

POWERSWEEP INCLUDING GEARBOX SHIFTER MECHANISM

CROSS-REFERENCE TO RELATED APPLICATIONS

This application claims the benefit of U.S. Provisional Application No. 62/818,307, filed on Mar. 14, 2019. The above application is hereby incorporated herein in its entirety by reference.

FIELD

The present disclosure relates to powersweeps used in removing grains, such as wheat, oats, rye, barley, corn and rice from storage bins; and more particularly to powersweep gearbox shifter mechanisms.

BACKGROUND

This section provides background information related to the present disclosure which is not necessarily prior art.

Typically, grain is evacuated from a grain bin in two distinct phases: a gravity unloading phase and a sweeping phase. During the first unloading phase, slide gates are opened within the sumps to clear material via gravity from inside the bin. The bin floor can be a perforated floor through which air passes to aerate the grain in the bin. A below floor unload conveying system is engaged that can move the grain from the sumps to the exterior of the bin. During this initial unloading phase, the above floor sweep conveyor of the powersweep is idle.

Once all material has been evacuated via gravity through the center and any intermediate sumps, the next phase is activated: the sweeping phase. During the sweeping phase, the above floor rotating sweep conveyor is used to pull material from the edges of the bin into the center sump so that the below floor unload conveying system can evacuate the grain to the exterior of the bin.

The two phases must be done in order, as activating the above floor sweep conveyor of the powersweep would have catastrophic effects on the functionality of the powersweep as a whole. A shift mechanism is used to control the engagement of the above floor sweep conveyor to enable operation of the unload conveyor below the grain bin floor without activating the above floor sweep. The head of the unload conveyor is the end near the center of the bin where material enters, and the tail of the unload conveyor is the end outside the bin to which the material is conveyed. The head of the above floor sweep conveyor of the powersweep is the end closest to the bin wall, and the tail of the above floor sweep conveyor is the end nearest the center of the bin at which the grain is transferred to the center sump.

Powersweeps must have an engagement mechanism to control when to activate the above floor sweep conveyor. Zero bin entry operation requires that no human needs to enter into the grain bin in order to fully operate both the unload phase and sweep phase of the bin emptying process. To achieve zero bin entry, the shift engagement must be operated from outside of the grain bin, while the gearbox being shifted is at the head of the sweep conveyor and the center sump of the bin. A system must be in place to effectively engage and disengage the above floor portion of the powersweep from outside of the bin.

Typically, powersweep shift mechanisms utilize a control rod that extends from the head of the bin unload system to the outside of the bin wall which can be pulled or pushed by an operator to engage or disengage the above floor conveyor. The control rod can extend from the center of the bin to the outside in a horizontal axis, without any vertical portions. An option for a shift lever can be used on some models, such that a vertical arm is fixed at a first pivot point and also pivotably coupled at a second movable pivot point to the horizontal control arm, such that adjusting the vertical arm moves the horizontal control rod laterally to engage or disengage. A pin or bolt can be used to lock the horizontal or vertical control rods into the engaged or disengaged position to minimize unwanted shifting.

Some examples of powersweeps can be found in U.S. Pat. No. 8,210,342 issued to Lepp et al. on Jul. 3, 2012, and U.S. Pat. No. 6,254,329 issued to Sukup et al. on Jul. 3, 2001. The above referenced patents (and any other U.S. patents or patent publications identified herein) are incorporated herein by reference in their entirety.

SUMMARY

This section provides a general summary of the disclosure, and is not a comprehensive disclosure of its full scope or all of its features.

In accordance with an aspect of the present disclosure, a grain bin powersweep with a gearbox shifting mechanism can include a grain bin unload conveyor positioned under a floor of a grain bin and a grain bin sweep conveyor positioned above the floor of the grain bin. A gearbox can be positioned under the floor of, and at the center of, the grain bin. The gearbox can have a shift coupling movable between a drive position in which the sweep conveyor is operably engaged with the unload conveyor, and a neutral position in which the sweep conveyor is operably disengaged from the unload conveyor. A shifter arm can be coupled to the external shift coupling. A control rod can extend from a handle at an exterior of the grain bin to the center of the grain bin. The control rod can be axially movable between a corresponding drive position and a corresponding neutral position. A pair of biasing members can be operably positioned at the center of the grain bin, and between the control rod and the shifter arm, to bias the shifter arm in opposite directions. A neutral positioning recess and a drive positioning recess can be located at the exterior of the grain bin into which the control rod is selectively positionable. A biasing force of a first of the pair of biasing members can act against an opposite biasing force of a second of the pair of biasing members to bias the control rod into the neutral positioning recess to retain the external shift coupling and the control rod in the neutral position and the corresponding neutral position, respectively. The opposite biasing force of the second of the pair of biasing members can act against the biasing force of the first of the pair of biasing members to bias the control rod into the drive positioning recess to retain the external shift coupling and the control rod in the drive position and the corresponding drive position, respectively.

In accordance with an aspect of the present disclosure, a grain bin powersweep with a gearbox shifting mechanism can include a grain bin unload conveyor positioned under a floor of a grain bin and a grain bin sweep conveyor positioned above the floor of the grain bin. A gearbox can be positioned under the floor of, and at the center of, the grain bin and can have an external shift coupling movable between a drive position in which the sweep conveyor is operably engaged with the unload conveyor, and a neutral position in which the sweep conveyor is operably disengaged from unload conveyor. A shifter arm can be coupled to the external shift coupling. A control rod can extend from a handle at an exterior of the grain bin to the center of the grain bin. The control rod can be axially movable between a corresponding drive position and a corresponding neutral position. A sliding coupling can be mounted at the center of the grain bin on the control rod and between a pair of stops and a pair of springs. The pair of springs can exert a biasing force acting on the sliding coupling in opposite directions. The sliding coupling can be operably coupled to the shifter arm to move the external shift coupling. A neutral positioning recess and a drive positioning recess can be located at the exterior of the grain bin into which the control rod is selectively positionable. A first of the pair of springs can be expanded while a second of the pair of springs is compressed to bias the control rod into the neutral positioning recess to retain the external shift coupling and the control rod in the neutral position and the corresponding neutral position, respectively. The second of the pair of springs can be expanded while the first of the pair of springs is compressed to bias the control rod into the drive positioning recess to retain the external shift coupling and the control rod in the drive position and the corresponding drive position, respectively.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

With reference to FIGS. 1-9, an example embodiment of grain bin powersweep 62 including a gearbox shifting mechanism 20 in accordance with the present disclosure is illustrated and described. As discussed above, a powersweep 62 includes an unload conveyor 64 below the bin floor 68 coupled to a gearbox 42 that is located below the bin floor 68 at the center sump 72 of the grain bin 52 and operably between a head of a below floor unload conveyor 64 and a tail of a sweep conveyor 66 above the bin floor 68. The gearbox shifting mechanism 20 operates to selectively shift the below floor gearbox 42 between neutral or disengaged during a gravity unload phase, in which the above floor sweep conveyor 66 is operably disengaged from the below floor unload conveyor 64, and drive or engaged during a sweep unload phase, in which the above floor sweep conveyor 66 is driven by and operably engaged with the below floor unload conveyor 64 via an above floor gearbox 70.

Figure 1:
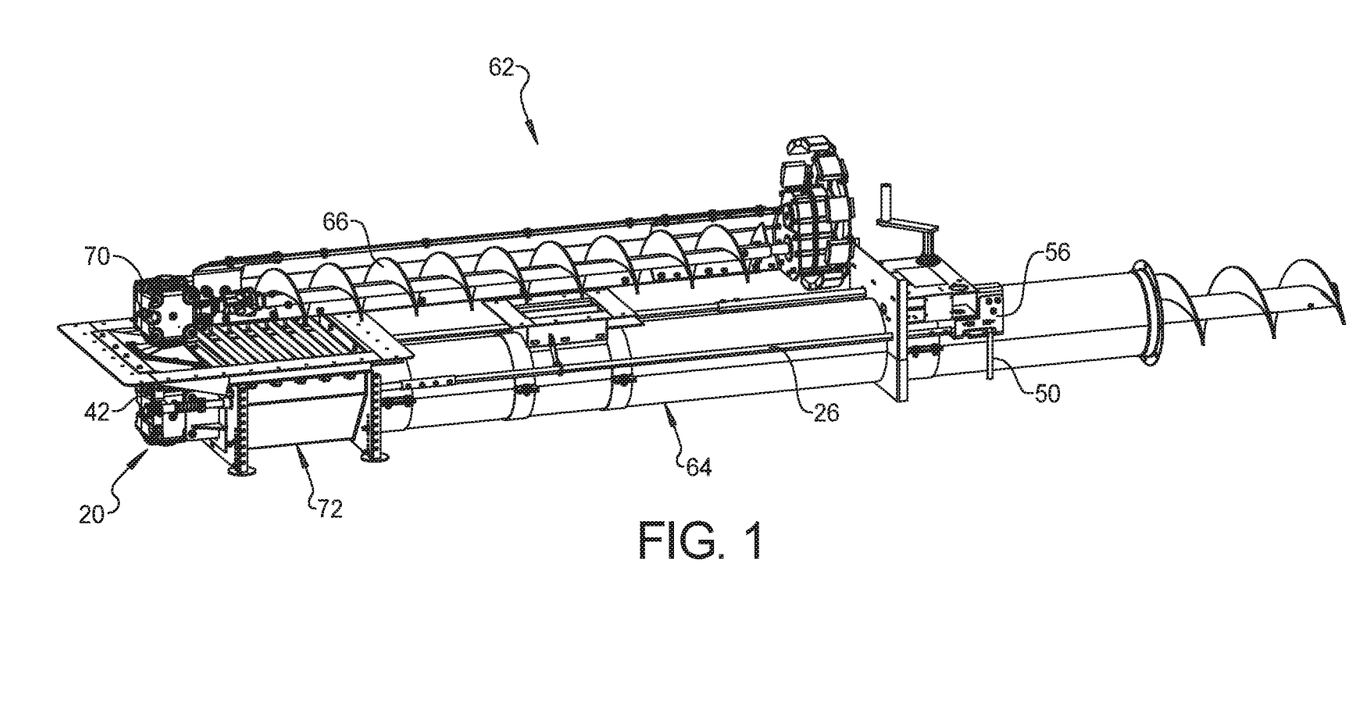
FIG. 1 is a perspective view of an example powersweep with a gearbox shifting mechanism in accordance with the present disclosure.
Figure 2:
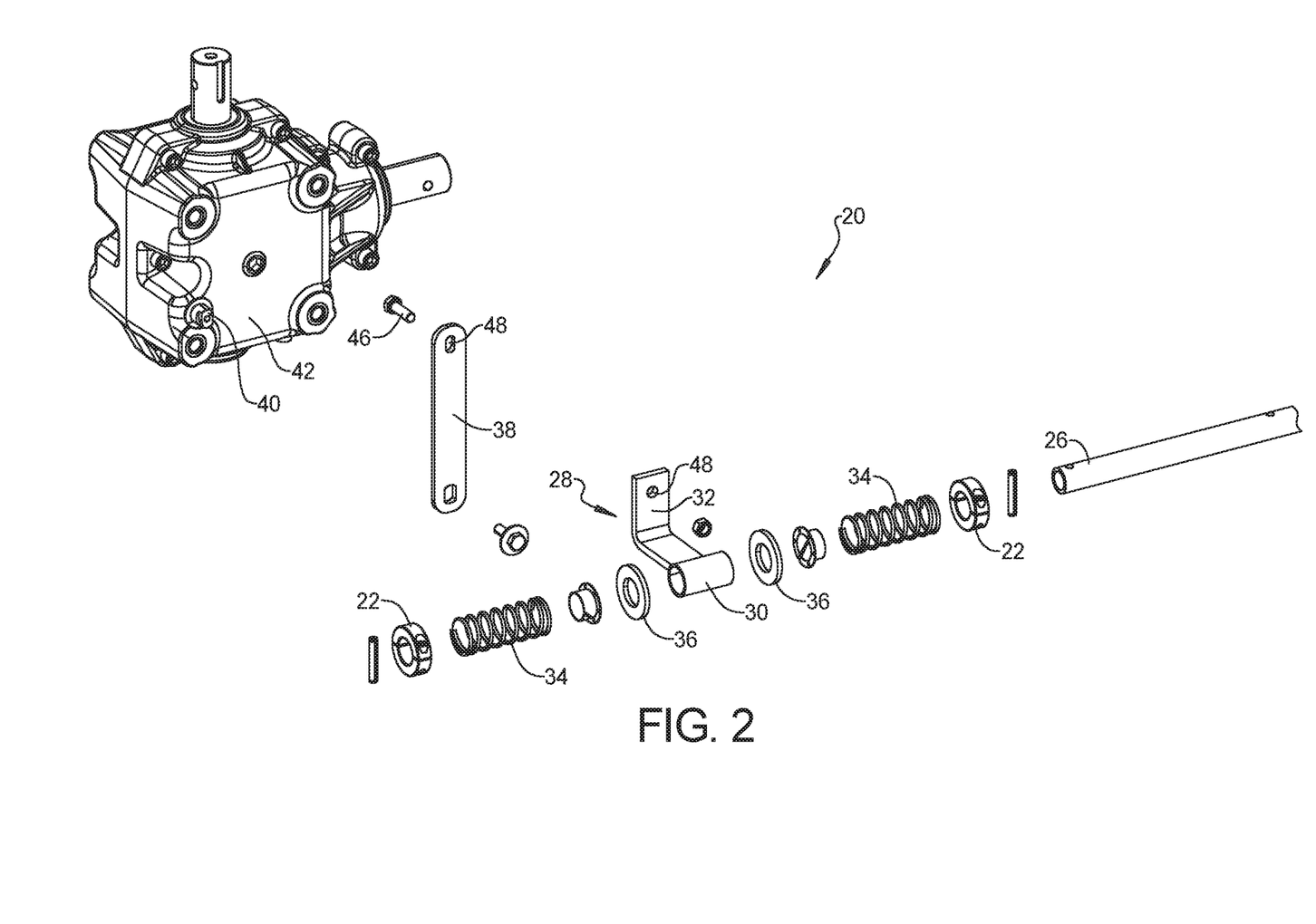
FIG. 2 is an exploded view of components of the example powersweep with the gearbox shifting mechanism of FIG. 1.
Figure 3:
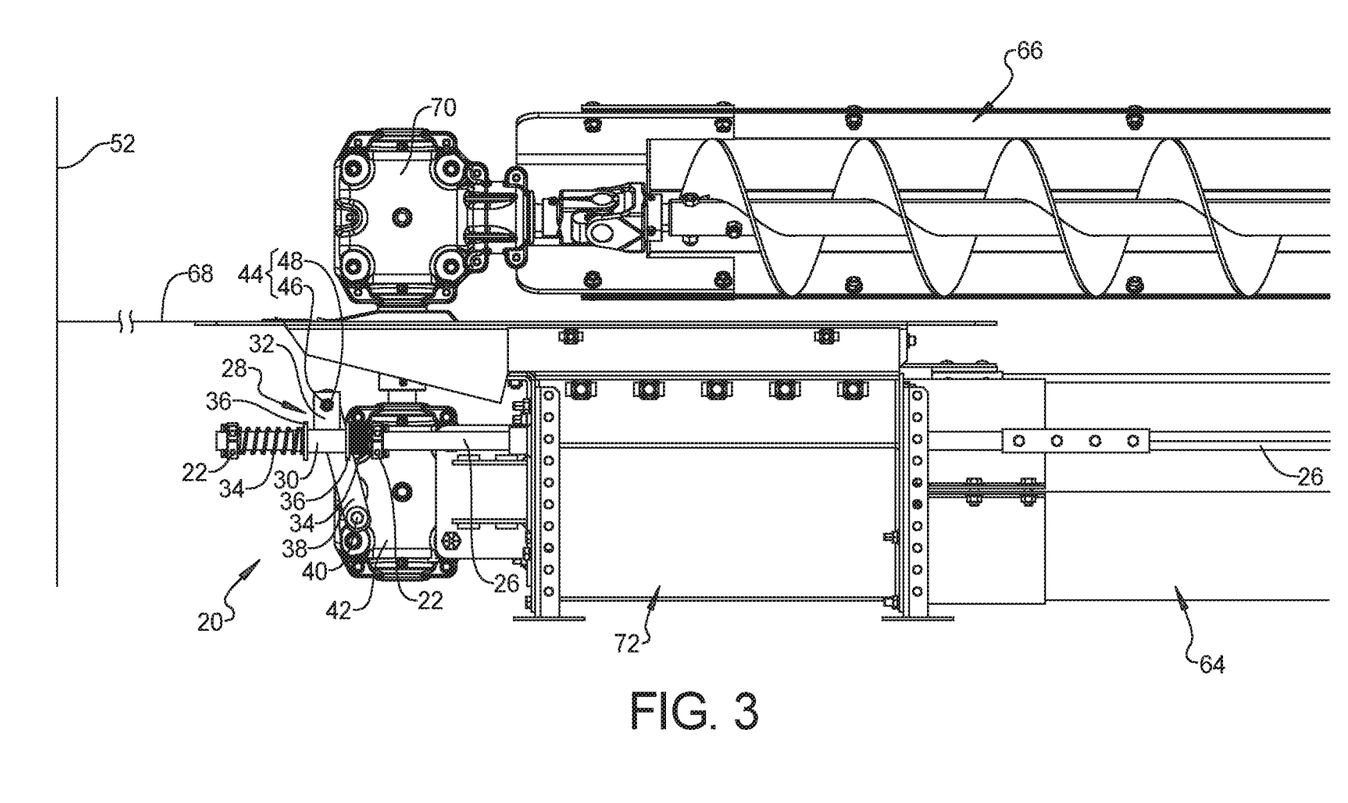
FIG. 3 is a fragmentary side elevation view of the example powersweep with the gearbox shifting mechanism of FIG. 1 in a drive position or configuration.
Figure 4:
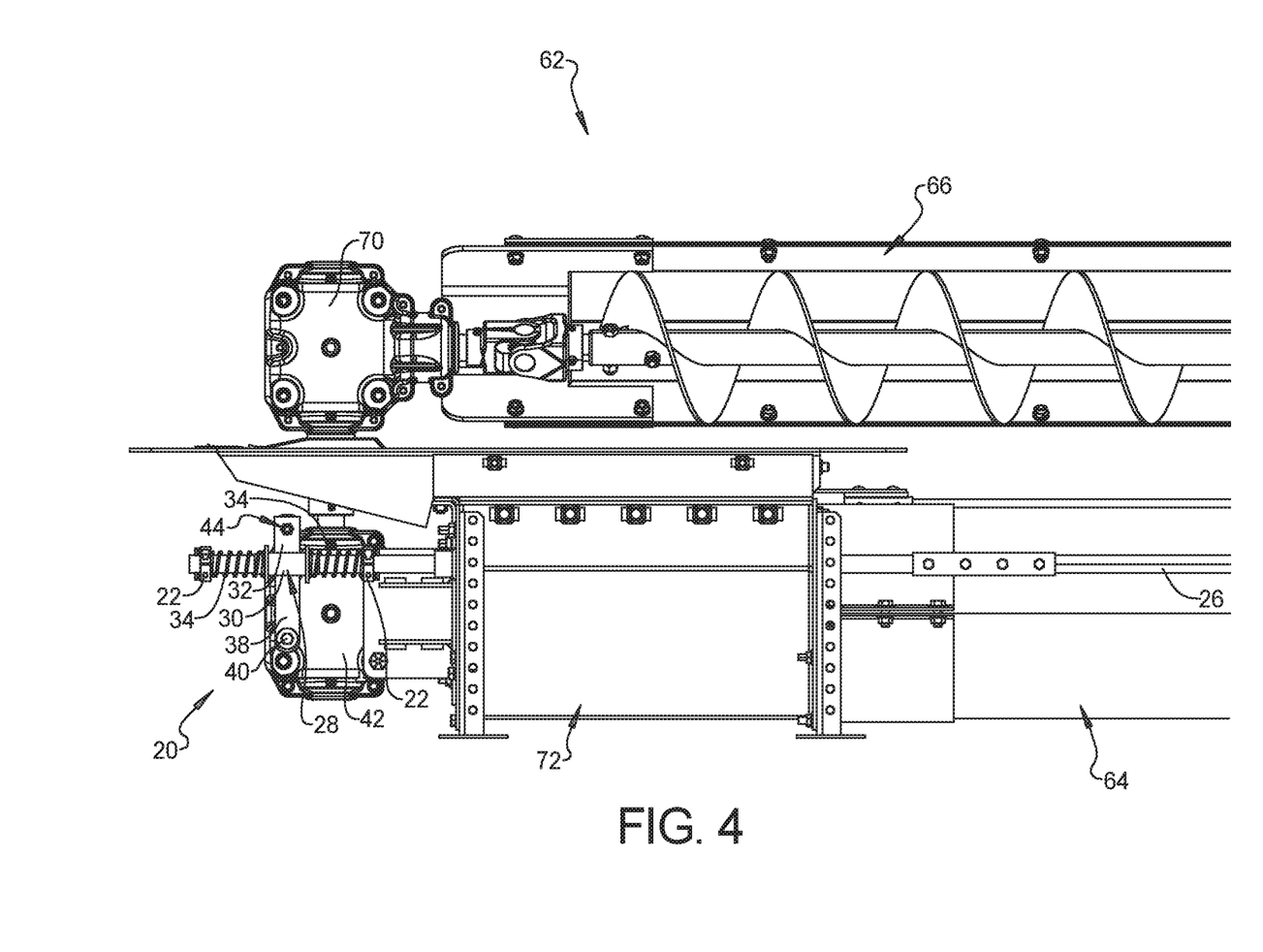
FIG. 4 is a fragmentary side elevation view similar to FIG. 3 with the gearbox shifting mechanism of FIG. 1 in a central or middle position or configuration between drive and neutral.
Figure 5:
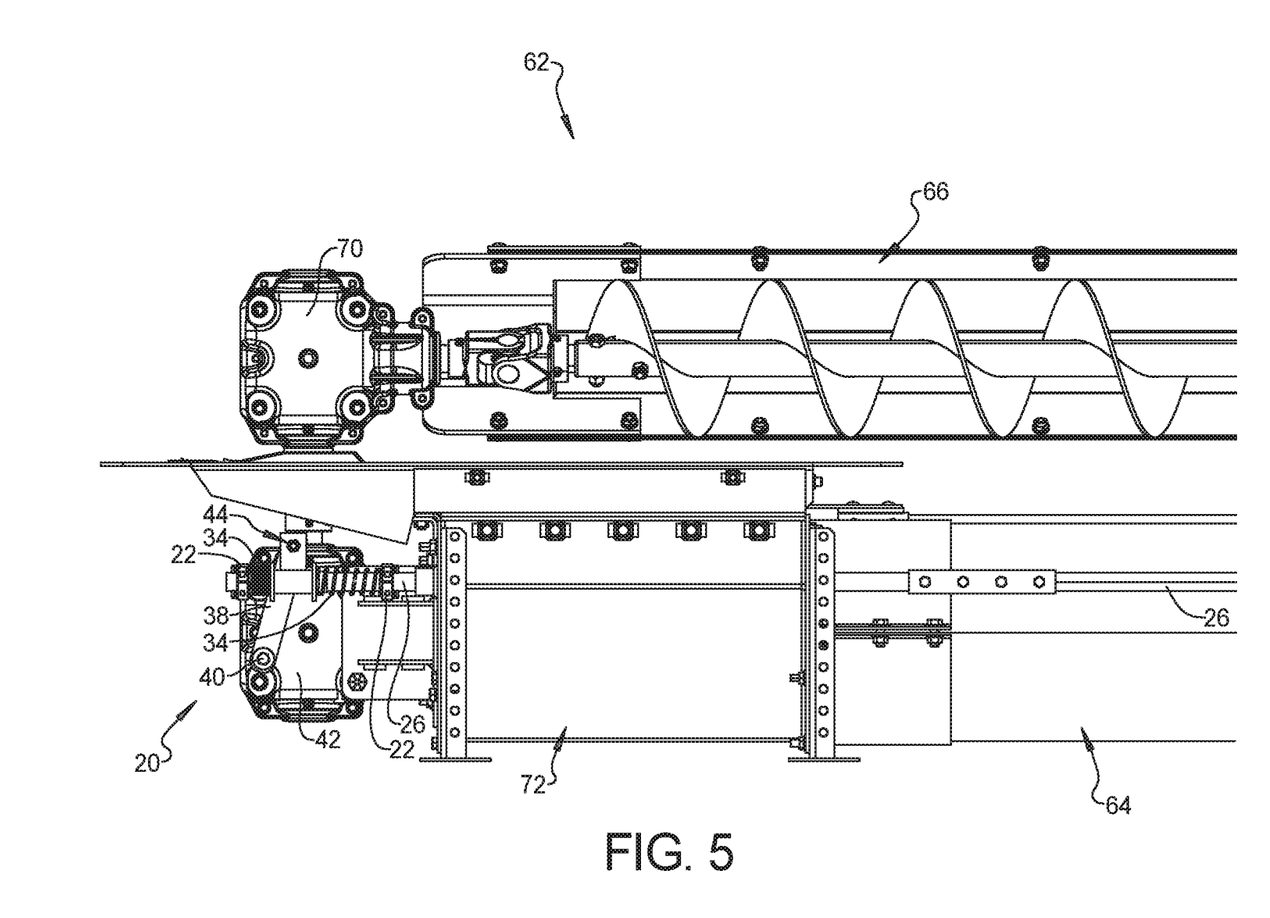
FIG. 5 is a fragmentary side elevation view similar to FIG. 3 with the gearbox shifting mechanism of FIG. 1 in a in a neutral position or configuration.
Figure 6:
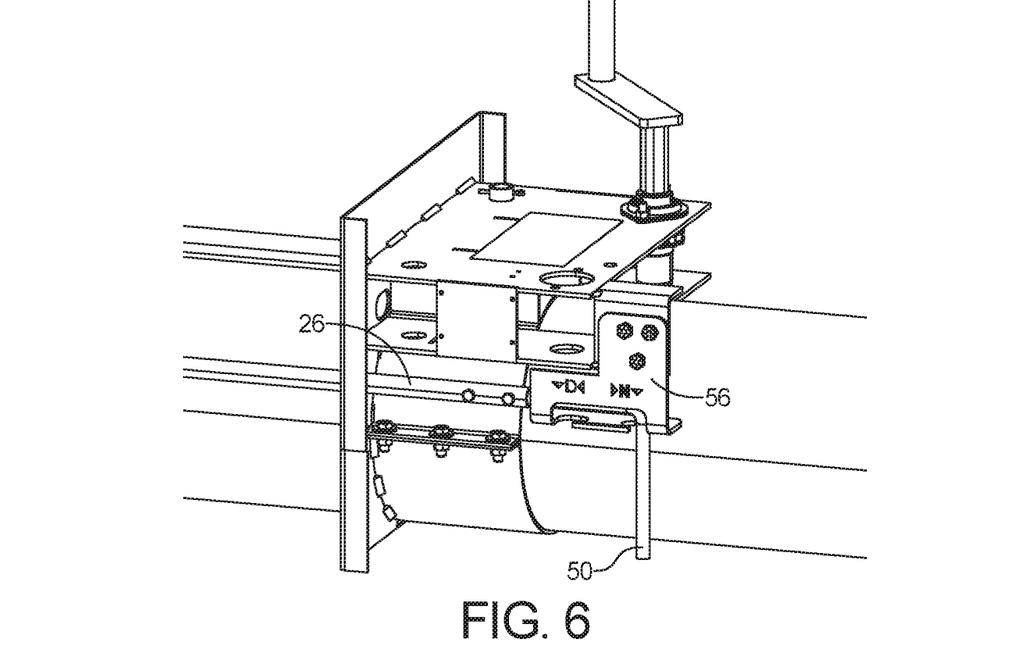
FIG. 6 is a perspective view including the exterior portion of the control rod and related components of the gearbox shifting mechanism of FIG. 1.
Figure 7:
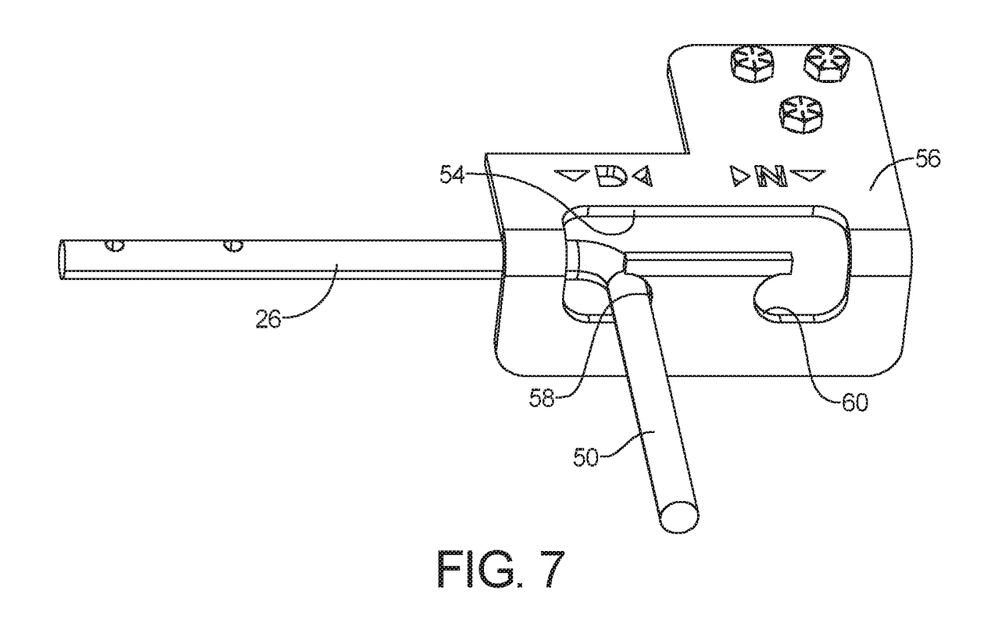
FIG. 7 is a perspective view of the exterior portion of the control rod and lock bracket or plate of FIG. 6 in the drive position corresponding to FIG. 3.
Figure 8:
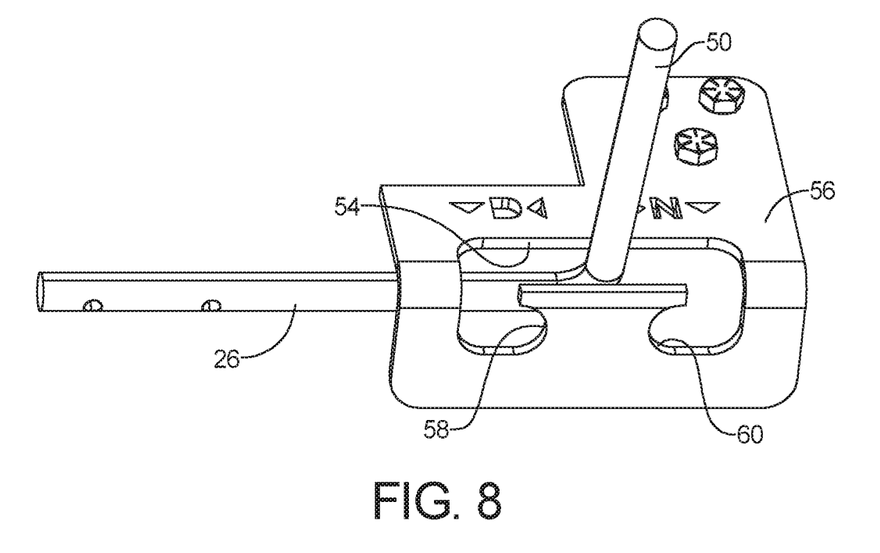
FIG. 8 is a perspective view similar to FIG. 7 with the control rod in the central or middle position corresponding to FIG. 4.
Figure 9:
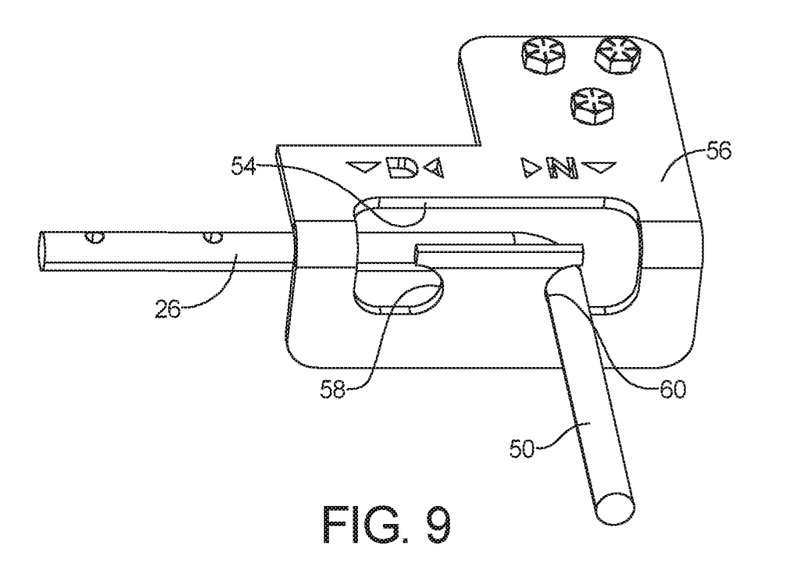
FIG. 9 is a perspective view similar to FIG. 7 with the control rod in the neutral position corresponding to FIG. 5.

In the illustrated example powersweep gearbox shifter mechanism 20, a pair of spring stops 22, such as taper locks, are fixedly coupled to a central or internal end of a control rod 26. A sliding coupling 28 is mounted on the control rod 26 between the spring stops 22. As in this embodiment, the sliding coupling 28 can include a tube or collar 30 with an arm or linkage 32 coupled to the collar 30 at a first end extending therefrom. A biasing member 34, such as a spring, can be positioned between each end of the sliding coupling 28 and the spring stops 22. The springs 34 exert biasing forces on the sliding coupling 28 which can together urge the sliding coupling 28 into a central position relative to the spring stops 22 (FIG. 4). Annular rings or washers 36 can be positioned between the springs 34 and each end of the sliding coupling 28, or coupled to each end thereof, to provide an enlarged surface for each spring 34 to push against.

A main shifter arm or linkage 38 can be attached at a first end to an external gearbox shifter coupling 40 that controls an internal shifter mechanism within the gearbox 42. The second, other, distal, or coupling ends of the main shifter arm 38 and the sliding coupling arm 32 can be pivotably coupled together via a pivot coupling 44. The coupling ends of the main shifter arm 38 and the sliding coupling arm 32 can extend vertically so that the pivot axis of the pivot coupling 44 therebetween can extend horizontally. The arm or linkage 32 of the sliding coupling 28 can have a generally "L" or angled shape. The pivot coupling 44 can include, for example, a fastener, pin, etc. 46, extending through at least one aperture 48 in the coupling ends of the arms 32, 38 and the at least one aperture 48 can be elongated or enlarged to accommodate the arc of the main shifter arm 38 as it moves between neutral and drive positions. Thus, horizontal or axial motion of the control rod 26 can be converted to the pivoting or rotational motion required by the gearbox shifter coupling 40.

An opposite, peripheral or external end of the control rod 26 can include a handle portion 50 at an exterior of the grain bin 52. As illustrated, the handle 50 can be provided by simply bending the distal end of the control rod 26 at a 90° or other angle. Alternatively, the handle 50 can be a separate component mounted to the exteriorly extending portion of the control rod 26. The control rod 26 can extend through a slotted aperture 54 of a shifter lock bracket or plate 56. The shape of the slotted aperture 54 can include a distinct first or drive "D" positioning recess 58 and a distinct second or neutral "N" positioning recess 60. In this example, the slotted aperture 54 can have an overall generally "C" shape, with the drive and neutral positioning recesses 58, 60 at the distal ends of the C-shaped slotted aperture 54.

As noted above, the springs 34 exert biasing forces on the sliding coupling 28 which can together urge the sliding coupling 28 into a central position relative to the spring stops 22 (FIG. 4). As in this example, the springs 34 and spring stops 22 can be located outside of the gearbox 42 and externally on the control rod 26. This arrangement can facilitate replacing worn or damaged springs 34, replacing the springs 34 with ones of a different biasing force or length, and repositioning the spring stops 22 on the control rod 26 in order to adjust the performance of the gearbox shift mechanism 20. For example, the positioning of the stops 22 on the control rod 26 can be designed or selected to position the sliding coupling 28 and main shifter arm 38 in a position that corresponds to a central position of the gearbox shifter coupling 40 and the internal shifter mechanism within the gearbox 42 between neutral and drive or disengaged and engaged positions, respectively.

In addition, the positioning of the stops 22 on the control rod 26 can be designed or selected so that a first of the springs 34 is expanded while a second one of the springs 34 is compressed (FIG. 3) to bias the external end of the control rod 26 into the drive positioning recess 58 (FIG. 7) and bias the sliding coupling 28 into a position that correspondingly positions the main shifter arm 38, gearbox shifter coupling 40, and the internal shifter mechanism within the gearbox 42 in the drive or engaged position. Likewise, the positioning of the stops 22 on the control rod 26 can be designed or selected so that the second one of the springs 34 is expanded while the first one of the springs 34 is compressed (FIG. 5) to bias the external end of the control rod 26 into the neutral positioning recess 60 (FIG. 9) and bias the slider coupling 28 into a neutral position that correspondingly positions the main shifter arm 38, gearbox shifter coupling 40, and the internal shifter mechanism within the gearbox 42 in the neutral or disengaged position.

As should be apparent from the above, the control rod 26 can be biased or locked into either the drive "D" or neutral "N" position by the nature of the design of the retaining bracket 56 and the springs 34 of the shifter mechanism 20. As a result, there is no need for an additional component, such as a through pin or bolt, to lock the control rod 26 into the desired position; particularly in the neutral or disengaged "N" position during the gravity unload phase.

In order to move the control rod 26 out of either of the positioning recesses, 58 or 60, in this example, the control rod 26 is first moved in a direction away from the intended positioning recess, 60 or 58, further compressing the relatively more compressed spring 34. Since the springs 34 always seek the central position, they can provide a mechanical assist to the operator when moving between positions. Once removed from the undesired positioning recess 58 or 60, the spring 34 under compression will attempt to force the control rod 26 into the central location which will be in the desired direction when switching between engaged and disengaged. The natural compression force within the springs 34 can attempt to force the horizontal control rod 26 into a central position between the "N" and "D" positioning recesses, 60 and 58, respectively; meaning the springs 34 are at rest when the handle 50 is between these positions. This can also provide the advantage of biasing the control rod 26 into the desired positioning recess 58 or 60.

As alluded to above, the relational positioning between the various components can be designed so that neither spring 34 is ever fully compressed throughout the operation of the shifter mechanism 20. Thus, the springs 34 can act as a dampener whenever the control rod 26 is operated. In addition, by removing the fixed connection between the vertical shifter arm 38 and the horizontal control rod 26 and replacing it with springs 34, a smoother interaction is achieved.

The relational positioning between the various components can be designed so that not only can the springs 34 operate to bias the shifter or control rod 26 into the desired positioning recess, 58 or 60, the springs 34 can simultaneously operate to bias the main link shifter arm 38, gearbox shifter coupling 40, and the internal shifter mechanism within the gearbox 42 into the corresponding desired positions; i.e., either drive/engaged "D" or neutral/disengaged "N".

Another benefit that can be provided by replacing the normal fixed connection with the slidable coupling 28 and springs 34 is an increased length of the pull or movement of the control rod 26 can be provided. In contrast, prior designs are typically activated and deactivated within a narrow range or short distance horizontally, due to the nature of the internal gearbox shifter mechanism. In this example, however, the springs 34 enable a much broader range or longer horizontal distance of movement of the control rod 26. This increased separation between the two positions can help ensure proper usage of the powersweep 62. This greater disparity between the neutral "N" and drive "D" positions makes it easier for an operator to discern whether the shifter mechanism 20 is in the desired position or not, while also helping to ensure the internal gearbox shifter is actually in the corresponding shift mode or position.

Of course, many of the features described herein may be replaced with known equivalents. For example, although the above description has referred specifically to springs, alternative biasing members 34 can be used. In addition, although the example above involves a gearbox that has only two distinct shift positions, drive and neutral, the disclosure is not limited to such gearboxes. For example, the shifter mechanism is likewise applicable to a gearbox that has three distinct shift positions, drive, neutral, and reverse. If desired, the biasing members can operate to selectively bias the control rod into corresponding drive, neutral, and reverse positioning recesses with the appropriate selection of biasing members and appropriate positioning of the stops, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A grain bin powersweep comprising:
   a grain bin unload conveyor positioned under a floor of a grain bin;
   a grain bin sweep conveyor positioned above the floor of the grain bin;
   a gearbox positioned under the floor of, and at the center of, the grain bin and having an external shift coupling movable between a drive position in which the sweep conveyor is operably engaged with the unload conveyor, and a neutral position in which the sweep conveyor is operably disengaged from the unload conveyor;
   a shifter arm coupled to the external shift coupling;

a control rod extending from a handle at an exterior of the grain bin to the center of the grain bin, the control rod being axially movable between a corresponding drive position and a corresponding neutral position;

a pair of biasing members operably positioned at the center of the grain bin and between the control rod and the shifter arm to bias the shifter arm in opposite directions;

a neutral positioning recess and a drive positioning recess at the exterior of the grain bin into which the control rod is selectively positionable;

wherein a biasing force of a first biasing member of the pair of biasing members acts against an opposite biasing force of a second biasing member of the pair of biasing members to bias the control rod into the neutral positioning recess to retain the external shift coupling and the control rod in the neutral position and the corresponding neutral position, respectively, and wherein the opposite biasing force of the second biasing member of the pair of biasing members acts against the biasing force of the first biasing member of the pair of biasing members to bias the control rod into the drive positioning recess to retain the external shift coupling and the control rod in the drive position and the corresponding drive position, respectively.

2. The grain bin powersweep of claim 1, wherein the biasing force of the first biasing member of the pair of biasing members and the opposite biasing force of the second biasing member of the pair of biasing members together urge the control rod toward a central position between the corresponding drive position and the corresponding neutral position.

3. The grain bin powersweep of claim 1, wherein the pair of biasing members are operably positioned between the control rod and the shifter arm to provide the control rod with an axial shifting distance between the corresponding drive position and the corresponding neutral position, which is greater than a corresponding shifting distance that the shifter arm moves.

4. The grain bin powersweep of claim 1, wherein the control rod extends through a slotted aperture in a shifter lock bracket with the neutral positioning recess and the drive positioning recess being at opposite ends of the slotted aperture.

5. The grain bin powersweep of claim 4, wherein the slotted aperture is C-shaped.

6. The grain bin powersweep of claim 4, wherein the slotted aperture is designed to prevent either of the pair of biasing members from becoming fully compressed throughout operation.

7. A grain bin powersweep comprising:

a grain bin unload conveyor positioned under a floor of a grain bin;

a grain bin sweep conveyor positioned above the floor of the grain bin;

a gearbox positioned under the floor of, and at the center of, the grain bin and having an external shift coupling movable between a drive position in which the sweep conveyor is operably engaged with the unload conveyor, and a neutral position in which the sweep conveyor is operably disengaged from unload conveyor;

a shifter arm coupled to the external shift coupling;

a control rod extending from a handle at an exterior of the grain bin to the center of the grain bin, the control rod being axially movable between a corresponding drive position and a corresponding neutral position;

a sliding coupling mounted at the center of the grain bin on the control rod and between a pair of stops and a pair of springs, the pair of springs exerting a biasing force acting on the sliding coupling in opposite directions, the sliding coupling being operably coupled to the shifter arm to move the external shift coupling;

a neutral positioning recess and a drive positioning recess at the exterior of the grain bin into which the control rod is selectively positionable;

wherein a first spring of the pair of springs is expanded while a second spring of the pair of springs is compressed to bias the control rod into the neutral positioning recess to retain the external shift coupling and the control rod in the neutral position and the corresponding neutral position, respectively, and wherein the second spring of the pair of springs is expanded while the first spring of the pair of springs is compressed to bias the control rod into the drive positioning recess to retain the external shift coupling and the control rod in the drive position and the corresponding drive position, respectively.

8. The grain bin powersweep of claim 7, wherein the first spring of the pair of springs and the second spring of the pair of springs together urge the control rod toward a central position between the corresponding drive position and the corresponding neutral position.

9. The grain bin powersweep of claim 7, wherein the pair of springs are operably positioned on the control rod between the spring stops and the sliding coupling to provide the control rod with an axial shifting distance between the corresponding drive position and the corresponding neutral position, which is greater than a corresponding shifting distance that the shifter arm moves.

10. The grain bin powersweep of claim 7, wherein the control rod extends through a slotted aperture in a shifter lock bracket with the neutral positioning recess and the drive positioning recess being at opposite ends of the slotted aperture.

11. The grain bin powersweep of claim 10, wherein the slotted aperture is C-shaped.

12. The grain bin powersweep of claim 10, wherein the slotted aperture is designed to prevent either of the pair of springs from becoming fully compressed throughout operation.

13. The grain bin powersweep of claim 7, wherein the stops are taper locks.

14. The grain bin powersweep of claim 7, wherein a washer is positioned between each spring and the sliding coupling.

15. The grain bin powersweep of claim 7, wherein the sliding coupling comprises a collar with a coupling arm extending from the collar, and wherein the coupling arm of the sliding coupling is pivotably coupled to the shifter arm.

16. The grain bin powersweep of claim 15, wherein the coupling arm of the sliding coupling has an angled shape so that a coupling end of the coupling arm extends vertically.

17. The grain bin powersweep of claim 15, wherein the control rod extends through a slotted aperture in a shifter lock bracket with the neutral positioning recess and the drive positioning recess being at opposite ends of the slotted aperture.

18. The grain bin powersweep of claim 17, wherein the slotted aperture is C-shaped.

19. The grain bin powersweep of claim 17, wherein the slotted aperture is designed to prevent either of the pair of springs from becoming fully compressed throughout operation.

* * * * *